US011971678B2

(12) United States Patent
Hori

(10) Patent No.: US 11,971,678 B2
(45) Date of Patent: Apr. 30, 2024

(54) IMAGE FORMING DEVICE

(71) Applicant: SHARP KABUSHIKI KAISHA, Sakai (JP)

(72) Inventor: Takashi Hori, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/097,180

(22) Filed: Jan. 13, 2023

(65) Prior Publication Data

US 2023/0236537 A1 Jul. 27, 2023

(30) Foreign Application Priority Data

Jan. 26, 2022 (JP) ................................ 2022-010335

(51) Int. Cl.
*G03G 21/12* (2006.01)
*G03G 21/16* (2006.01)

(52) U.S. Cl.
CPC ......... *G03G 21/12* (2013.01); *G03G 21/1633* (2013.01); *G03G 21/1647* (2013.01); *G03G 2221/1654* (2013.01); *G03G 2221/1663* (2013.01)

(58) Field of Classification Search
CPC ............... G03G 21/12; G03G 21/1633; G03G 21/1647; G03G 2221/1654; G03G 2221/1663
See application file for complete search history.

(56) References Cited

U.S. PATENT DOCUMENTS

| | | | | |
|---|---|---|---|---|
| 7,245,868 | B2 * | 7/2007 | Arai | G03G 21/12 399/360 |
| 2019/0243299 | A1 * | 8/2019 | Furukawa | G03G 21/12 |
| 2020/0310336 | A1 * | 10/2020 | Gamo | G03G 21/1676 |

FOREIGN PATENT DOCUMENTS

| | | |
|---|---|---|
| JP | H06-317955 A | 11/1994 |
| JP | 2009-069764 A | 4/2009 |

* cited by examiner

*Primary Examiner* — Hoang X Ngo
(74) *Attorney, Agent, or Firm* — ScienBiziP, P.C.

(57) ABSTRACT

To provide an image forming device that can prompt a user to check whether a waste toner container is completely attached. The image forming device includes a housing, an access cover attached in an openable/closable manner to the housing, a waste toner container attachable to the housing with the access cover open, and a lock lever that locks the waste toner container and the housing. The access cover includes a protruding portion protruding toward an interior of the housing. The lock lever transitions between a locked state and a pressed state of being pressed by the waste toner container, and, when in the pressed state, moves to a preventing position at which the lock lever blocks the protruding portion and prevents the access cover from closing, and, when in the locked state, moves to a retracted position at which the lock lever does not block the protruding portion.

8 Claims, 15 Drawing Sheets

IMAGE FORMING DEVICE

TECHNICAL FIELD

The disclosure relates to an image forming device including a waste toner container mounted to a housing.

BACKGROUND ART

In an electrophotographic image forming device in the related art, a toner image is formed on an image carrier. Then, the toner image is transferred to a sheet and fixed to the sheet by a fixing device to form an image. In the transfer process, not all of the toner image visualized on a photoreceptor drum may be transferred, and toner may remain on the photoreceptor drum. Thus, residual toner is collected, and the surface of the photoreceptor drum is cleaned. The collected waste toner is stored in a waste toner collection box attached to a housing. The waste toner collection box is removably attached to the housing, and can be removed as required when a certain amount of toner has been collected.

However, since the waste toner collection box can be removed from the housing, the image forming device may be operated while the waste toner collection box is not attached. In such a case, the waste toner may splatter inside the housing. Therefore, a method of detecting whether a waste toner collection box is attached has been known.

SUMMARY

Technical Problem

An image forming device in the related art has a known configuration including a device main body including a front cover attached in an openable/closable manner to a front surface portion, an image forming unit, a cleaning unit configured to clean toner remaining on a surface of an image carrier (photoreceptor drum) of the image forming unit, a waste toner collection box configured to store waste toner discharged from the cleaning unit, and a preventing unit configured to prevent the front cover from fully closing when the waste toner collection box is not attached.

In the image forming device described above, the front cover can be closed if the waste toner collection box is attached, regardless of whether the waste toner collection box is correctly positioned. As a result, the waste toner may not be collected as intended.

Further, another image forming device in the related art has a known configuration including a detection unit configured to detect attachment and removal of a waste toner box and a notification unit configured to issue a warning indicating that it is time to replace the waste toner box, in which the notification unit ends issuance of the warning when removal and attachment of the waste toner box is detected.

The image forming device described above is not preferable because the detection unit configured to detect attachment and removal of the waste toner box is a required component, resulting in an increased number of components and an increase in costs.

The disclosure has been made to solve the above-described problems, and an object thereof is to provide an image forming device that can prompt a user to check whether a waste toner container is completely attached without the need for a new component or a sensor.

Solution to Problem

An image forming device according to the disclosure includes a housing, an access cover attached in an openable/closable manner to a side surface of the housing, a waste toner container attachable to the housing with the access cover open, and a lock lever that is attached to the housing and locks the waste toner container and the housing. The access cover includes a protruding portion protruding toward an interior of the housing. The lock lever transitions between a locked state of locking the waste toner container and a pressed state of being pressed by the waste toner container, and, when in the pressed state, moves to a preventing position at which the lock lever blocks the protruding portion and prevents the access cover from closing and, when in the locked state, moves to a retracted position at which the lock lever does not block the protruding portion.

The image forming device according to the disclosure may further include a biasing member biasing the lock lever in a direction from the preventing position toward the retracted position.

In the image forming device according to the disclosure, the lock lever may pivot about a fulcrum supported by the housing.

In the image forming device according to the disclosure, the lock lever may slide in a direction approaching the waste toner container and a direction separating from the waste toner container.

In the image forming device according to the disclosure, the waste toner container may include a claw portion to be locked with the lock lever, the lock lever may include a locking portion that locks the claw portion, a pressed portion that is pressed by the claw portion, and an opposing portion provided facing the access cover in a closed state. In the locked state, the locking portion may lock the claw portion, and, in the pressed state, the pressed portion may be pressed by the claw portion and the opposing portion may block the protruding portion.

In the image forming device according to the disclosure, the opposing portion may include an opposing projection protruding in a direction toward outside of the housing and, when the lock lever blocks the protruding portion, the opposing projection may be locked by the protruding portion, and movement of the lock lever in a direction from the preventing position toward the retracted position may be restricted.

In the image forming device according to the disclosure, the lock lever may be provided at positions respectively facing opposing side surfaces of the waste toner container.

The image forming device according to the disclosure may further include a detection unit that detects opening and closing of the access cover, and a notification unit that issues a warning when the detection unit detects that the access cover is opened.

Advantage Effects of Disclosure

According to this configuration, since the lock lever that locks the waste toner container blocks the access cover, it is possible to prompt a user to check whether the waste toner container is completely attached without the need for a new member or sensor.

DESCRIPTION OF EMBODIMENTS

First Embodiment

An image forming device according to a first embodiment of the disclosure will be described below with reference to the accompanying drawings.

Figure 1:
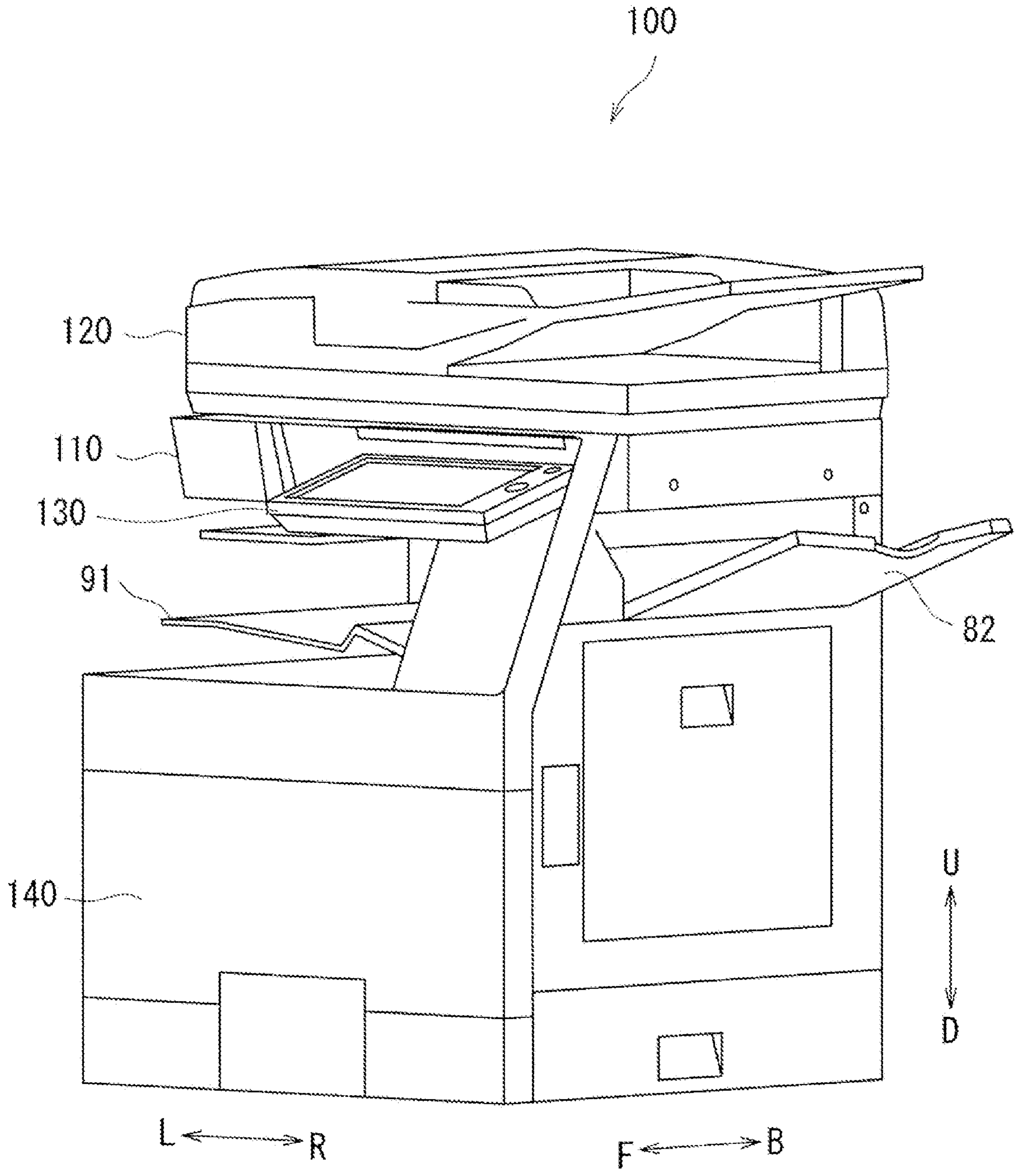
FIG. 1 is an external perspective view illustrating an image forming device according to a first embodiment of the disclosure.
Figure 2:
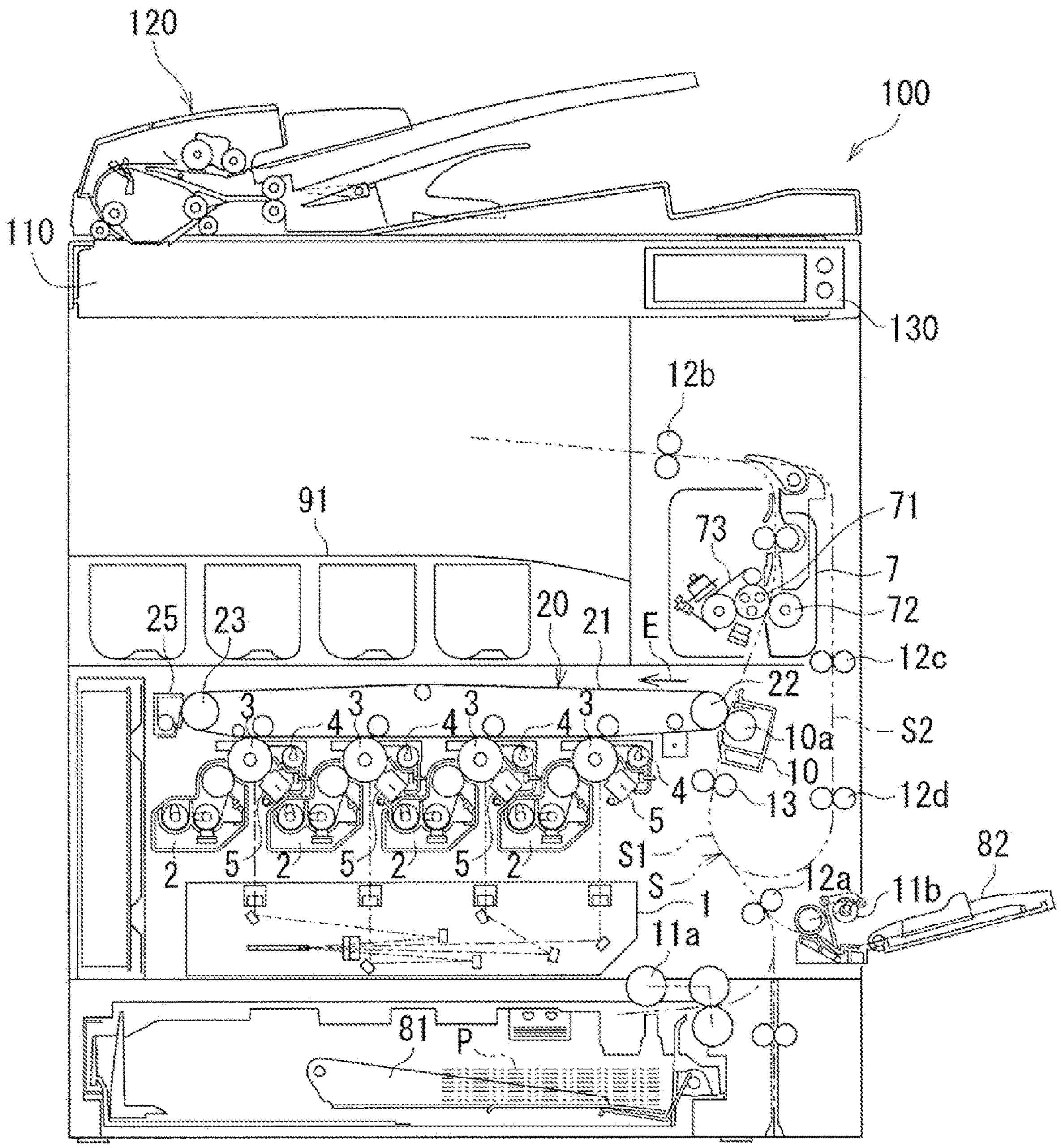
FIG. 2 is a schematic configuration diagram of the image forming device illustrated in FIG. 1.

FIG. 1 is an external perspective view illustrating the image forming device according to the first embodiment of the disclosure, and FIG. 2 is a schematic configuration diagram of the image forming device illustrated in FIG. 1.

An image forming device 100 is a multifunction printer having a scanner function, a copy function, a printer function, and a facsimile function, and is configured to transmit an image of a document scanned by an image scanning device 110 to an external device (corresponding to the scanner function), or form an image of a scanned document or an image received from an external device on a sheet in color or black and white (corresponding to the copy function, the printer function, and the facsimile function).

A document feeding device 120 (automatic document feeder (ADF)) supported in an openable/closable manner by the image scanning device 110 is provided on an upper side of the image scanning device 110. When the document feeding device 120 is opened, the image scanning device 110 is upwardly opened, and a document (sheet) can be manually placed on the image scanning device 110. Alternatively, the document feeding device 120 automatically feeds a placed document onto the image scanning device 110. The image scanning device 110 scans the placed document or a document fed from the document feeding device 120 to generate image data.

The image forming device 100 includes an exposure device 1, a development device 2, a photoreceptor drum 3, a cleaner device 4, a charger 5, an intermediate transfer belt device 6, a fixing device 7, a feed tray 81, a bypass tray 82, an output tray 91, and a sheet feeding path S, and forms a color image or a black and white image on a predetermined sheet in accordance with image data transmitted from an external device.

The image data used in the image forming device 100 corresponds to a color image made up of the colors of black (K), cyan (C), magenta (M), and yellow (Y). Accordingly, four development devices 2, four photoreceptor drums 3, four chargers 5, and four cleaner devices 4 are provided and set to black, cyan, magenta, and yellow, respectively, to form four types of latent images corresponding to each color. Thus, four image stations are configured.

The photoreceptor drums 3 are each disposed substantially at the center of the image forming device 100. The chargers 5 each uniformly charge the surface of each photoreceptor drum 3 such that the surface of each photoreceptor drum 3 has a predetermined potential. The exposure device 1 exposes the surface of each photoreceptor drum 3 to form an electrostatic latent image. The development devices 2 each develop the surface of each photoreceptor drum 3 where the electrostatic latent image is formed to form a toner image on the surface of each photoreceptor drum 3. With this series of operations, a toner image of each color is formed on the surface of each photoreceptor drum 3. The cleaner devices 4 each remove and collect residual toner on the surfaces of the photoreceptor drums 3 after development and image transfer.

The intermediate transfer belt device 20 is disposed above the photoreceptor drums 3 and includes an intermediate transfer belt 21, an intermediate transfer belt driving roller 22, an intermediate transfer belt driven roller 23, and an intermediate transfer belt cleaning device 25.

The intermediate transfer belt 21 is disposed in a tensioned state across the intermediate transfer belt driving roller 22 and the intermediate transfer belt driven roller 23, which are configured to move the surface of the intermediate transfer belt 21 in a predetermined direction (direction of the arrow E in FIG. 2).

The intermediate transfer belt 21 moves around the intermediate transfer belt driving roller 22 and the intermediate transfer belt driven roller 23 in the direction of the arrow E, the residual toner is removed and collected by the intermediate transfer belt cleaning device 25, and the toner images of each color formed on the respective surfaces of the photoreceptor drums 3 are sequentially transferred and superimposed to form a color toner image on the surface of the intermediate transfer belt 21.

The image forming device 100 further includes a secondary transfer device 10 including a transfer roller 10*a*. The transfer roller 10*a* forms a nip region with the intermediate transfer belt 21, and a sheet fed through the sheet feeding path S is fed while being nipped in the nip region. When the sheet passes through the nip region, the toner image on the surface of the intermediate transfer belt 21 is transferred to the sheet.

The feed tray 81 is a tray for storing sheets to be used for image formation, and is provided below the exposure device 1. The bypass tray 82 is provided on a side surface of the image forming device 100 (side surface on a rightward direction R side in FIG. 1), and is a tray on which a sheet used for image formation can be placed. The output tray 91 is provided on an upper side of the image forming device 100, and is a tray for placing sheets on which images have been formed.

The sheet feeding path S includes a main path S1 having an S-shape, and a reverse path S2 that branches off from and joins the main path S1 again. A pickup roller 11*a*, a bypass pickup roller 11*b*, a pre-registration roller 12*a*, a registration roller 13, the secondary transfer device 10, the fixing device 7, and an output roller 12*b* are disposed along the main path S1. The reverse path S2 branches from between the fixing device 7 and the output roller 12*b*, passes through a reverse feeding roller 12*c* and a reverse feeding roller 12*d*, and joins the main path S1 again between the pre-registration roller 12*a* and the registration roller 13.

The pickup roller 11*a* is provided in the vicinity of an end portion of the feed tray 81, and is a so-called pull-in roller that supplies sheets one by one from the feed tray 81 to the sheet feeding path S. The registration roller 13 temporarily holds the sheet fed from the feed tray 81, and feeds the sheet to the transfer roller 10*a* at a timing at which a leading end of the toner image on the photoreceptor drum 3 and a leading end of the sheet are aligned with each other. The pre-registration roller 12*a* is a small roller for promoting and assisting the feeding of the sheet.

The fixing device 7 includes a fixing roller 71, a pressure roller 72 pressed by the fixing roller 71, and a heating unit 73 that heats the fixing roller 71. The fixing device 7 receives a sheet on which an unfixed toner image is formed, and feeds the sheet while nipping the sheet between the fixing roller 71 and the pressure roller 72. The sheet with the image fixed is discharged onto the output tray 91 by the output roller 12*b*.

In a case in which an image is to be formed not only on the front side but also on the back side of the sheet, the sheet is fed in a reverse direction from the output roller 12*b* to the reverse path S2 to reverse the front and back of the sheet, the sheet is guided again to the registration roller 13, an image is formed on the back side in the same manner as on the front side, and the sheet is discharged to the output tray 91.

An operation panel 130 including an input unit and a display unit is provided on an upper portion of a side surface of the image forming device 100, on a front surface side. In the operation panel 130, buttons or the like may be provided outside a frame of the display unit, or the display unit may be a touch panel and also serve as an input unit.

An access cover 140 openable with respect to a housing 30 (refer to FIG. 4 described below) of the image forming device 100 is attached to a lower portion of a side surface of the image forming device 100 on the front surface side. The relationship between the access cover 140 and the housing 30 will be described with reference to FIG. 11 to FIG. 13 described below.

As illustrated in FIG. 1, the document feeding device 120 is provided on the upper portion of the image forming device 100, and the image scanning device 110 is provided below the document feeding device 120. Further, the output tray 91 is provided below the image scanning device 110 and substantially at the center of the image forming device 100.

Hereinafter, to facilitate description, directions in the housing 30 of the image forming device 100 may be referred to as follows. Specifically, an upward direction in a height direction is referred to as an upward direction U, and a downward direction in the height direction is referred to as a downward direction D. A direction toward the left in a width direction is referred to as a leftward direction L, and a direction toward the right in the width direction is referred to as a rightward direction R. Further, a direction toward the front in a depth direction is referred to as a frontward direction F, and a direction toward the back in the depth direction is referred to as a backward direction B. The same also applies to each member attached to the housing 30 for the directions of the members when attached to the housing 30.

Figure 3:
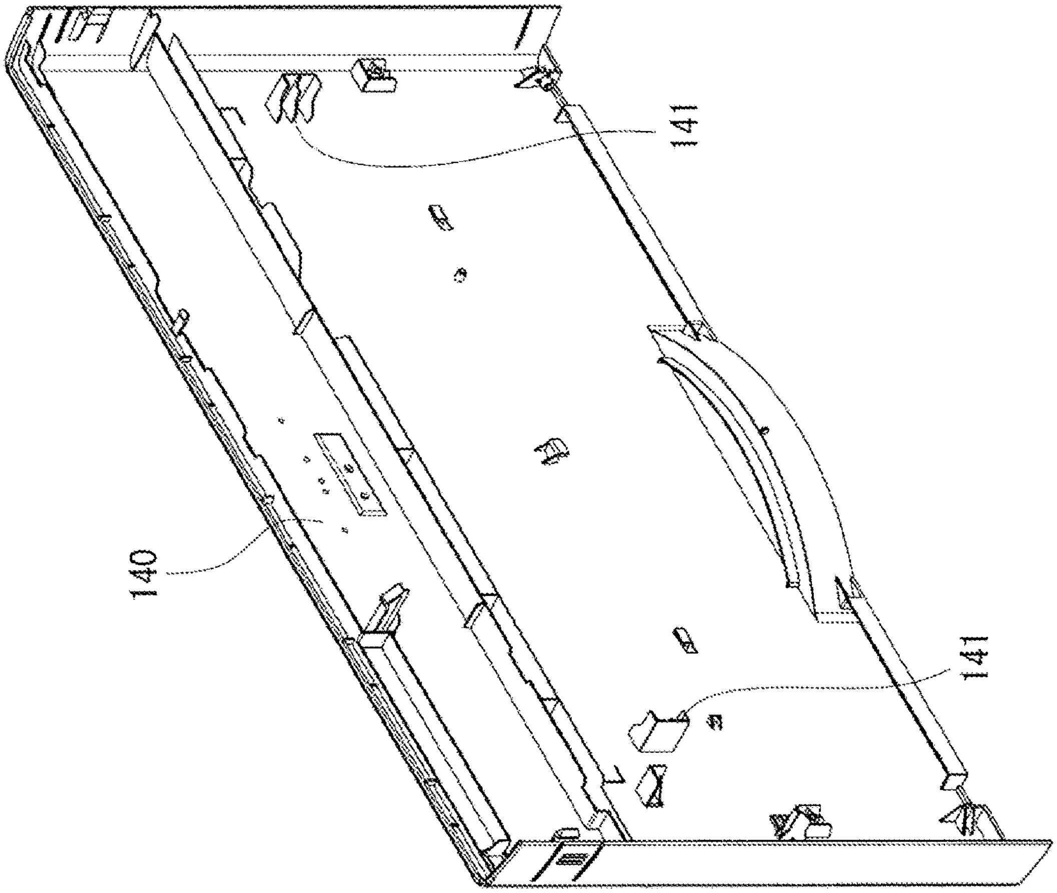
FIG. 3 is a perspective view illustrating an access cover as viewed from a back surface side.

FIG. 3 is a perspective view illustrating the access cover as viewed from a back surface side.

FIG. 3 illustrates a state in which the access cover 140 removed from the housing 30 is viewed from the back surface side facing an interior of the housing 30. The access cover 140 has a structure in which a lower end portion of the access cover 140 is pivotally supported by the housing 30. When opened and closed, the access cover 140 is pivoted with the lower end portion serving as a fulcrum such that an upper end portion is made to approach or separate from the housing 30. The upper end portion of the access cover 140 may be provided with a claw or the like for locking with the housing 30. Further, the housing 30 may be provided with a detection unit that detects the opening and closing of the access cover 140. The detection unit may be a contact type sensor that comes into direct contact with the upper end portion or another portion of the access cover 140, or may be a non-contact type sensor that detects whether the access cover 140 is located in the immediate vicinity of the housing 30.

The access cover 140 is provided with a protruding portion 141 that protrudes toward the interior of the housing 30. In the present embodiment, the protruding portion 141 is provided at two locations of the upper end portion spaced apart from each other in the left-right direction (leftward direction L and rightward direction R).

In the image forming device 100, a waste toner container 40 is provided in an attachable/removable manner with respect to the housing 30 provided in the main body portion of the image forming device 100. When the access cover 140 is opened, the mounting position of the waste toner container 40 in the housing 30 is exposed. Next, the relationship between a portion of the housing 30 and the waste toner container 40 will be described with reference to FIG. 4.

Figure 4:
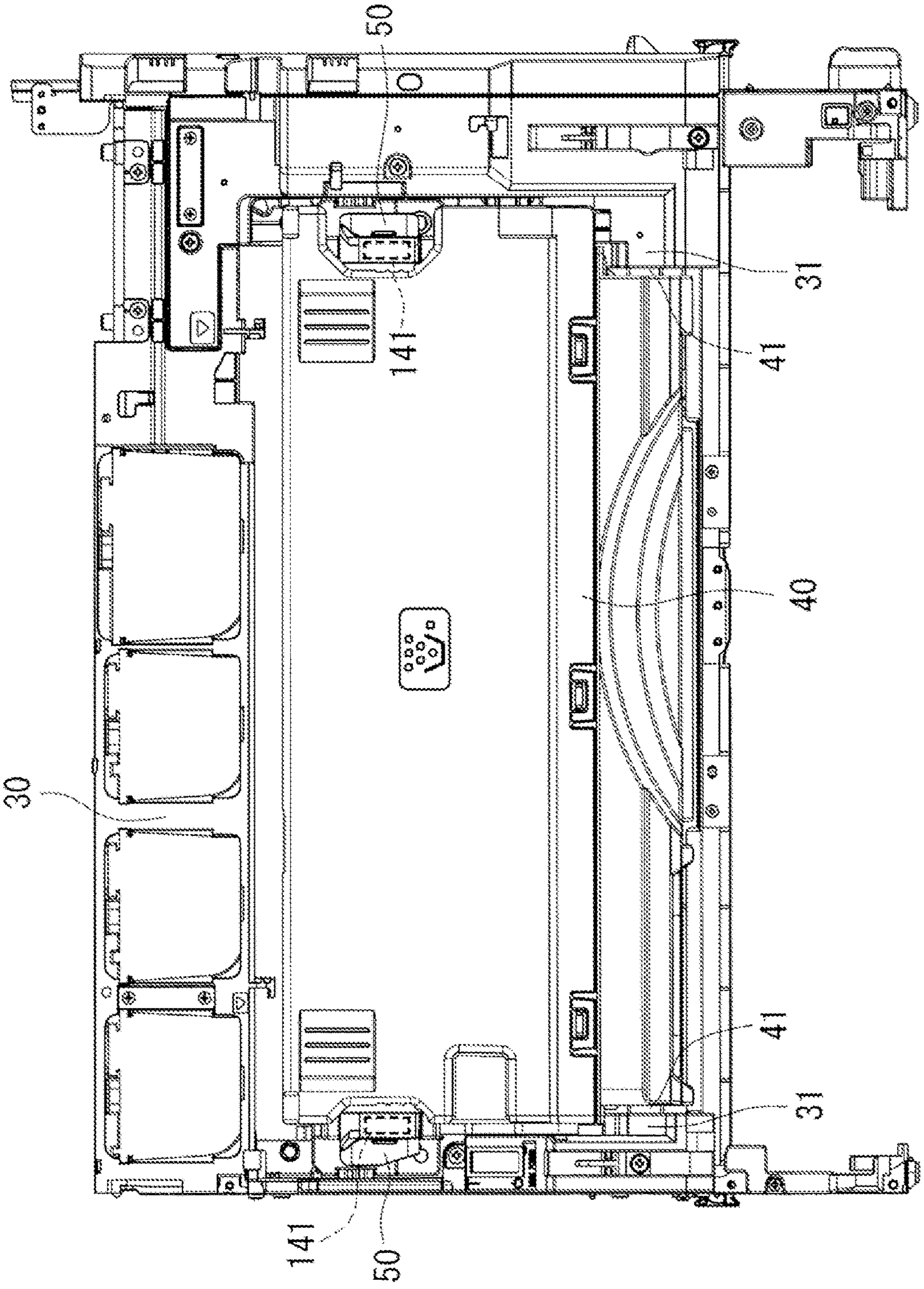
FIG. 4 is a schematic side view illustrating a portion of a housing and a waste toner container.

FIG. 4 is a schematic side view illustrating a portion of the housing and the waste toner container.

FIG. 4 illustrates a portion of the housing 30 provided on the front surface side of the image forming device 100, and illustrates a state in which the waste toner container 40 is attached to the housing 30. FIG. 4 illustrates a state in which the access cover 140 is removed from the housing 30, but in order to clarify the positional relationship between the access cover 140 and the housing 30, the position of the protruding portion 141 in the access cover 140 in a closed state is illustrated by a dashed line.

The waste toner container 40 is provided with a storage-side protruding portion 41 at a lower end portion, and the housing 30 is provided with a housing-side recessed portion 31 at a position corresponding to the storage-side protruding portion 41 in a state in which the waste toner container 40 is attached. The lower end portion of the waste toner container 40 is supported by the housing 30 when the storage-side protruding portion 41 is fitted into the housing-side recessed portion 31. Note that a detailed structure of the housing-side recessed portion 31 will be described with reference to FIG. 8 described below.

A lock lever 50 that locks the waste toner container 40 and the housing 30 is attached to the housing 30. The lock lever 50 is provided at two locations on either side surface of the housing 30 facing the waste toner container 40 in the left-right direction, at positions facing the upper end portion of the waste toner container 40 when the waste toner container 40 is attached to the housing 30. Note that a detailed structure of the lock lever 50 will be described with reference to FIG. 9 and FIG. 10 described below.

The two protruding portions 141 are provided at positions facing corresponding lock levers 50 when the access cover

140 is closed. Note that the positional relationship between the protruding portion 141 and the lock lever 50 will be described with reference to FIG. 11 to FIG. 13 described below.

Figure 5:
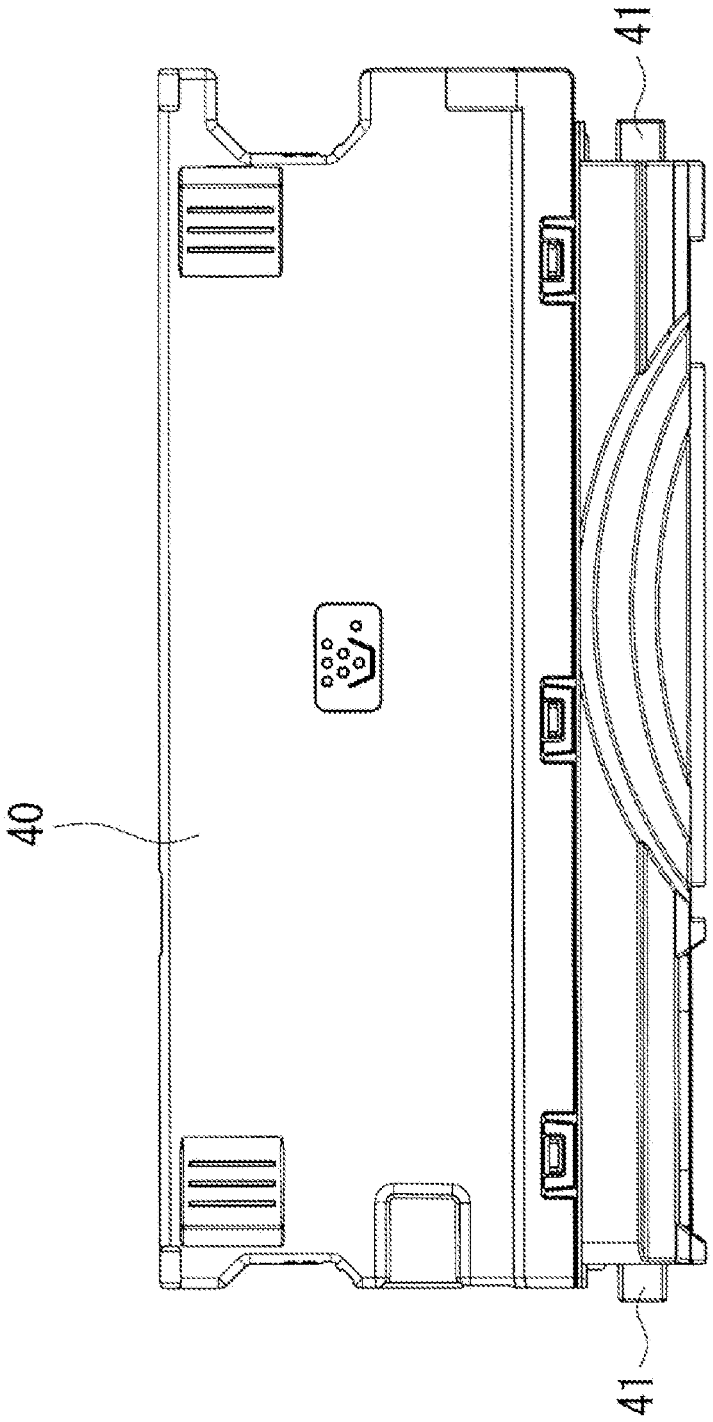
FIG. 5 is a schematic side view illustrating the waste toner container as viewed from a front surface side.
Figure 6:
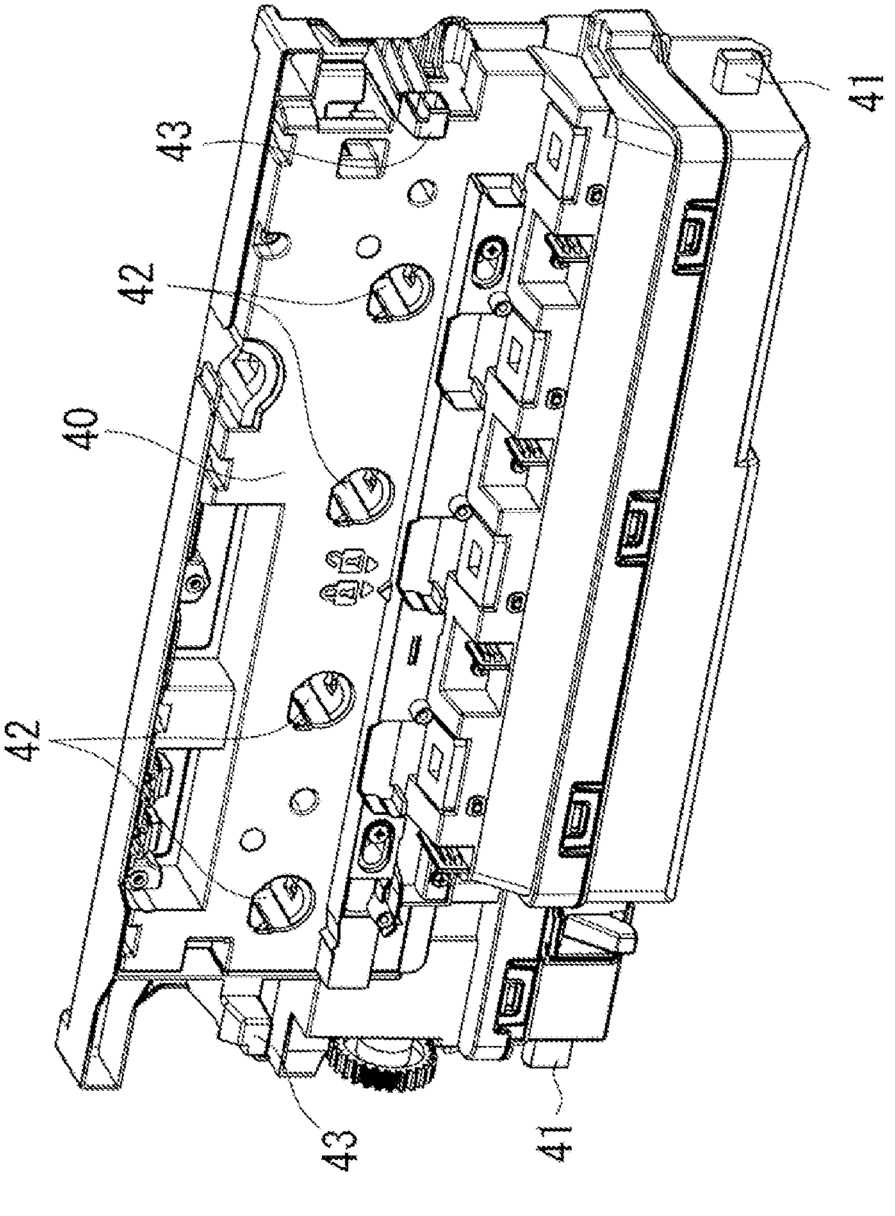
FIG. 6 is a schematic perspective view illustrating the waste toner container as viewed from the back surface side.

FIG. 5 is a schematic side view illustrating the waste toner container as viewed from the front surface side, and FIG. 6 is a schematic perspective view illustrating the waste toner container as viewed from the back surface side.

The waste toner container 40 is a container having a substantially rectangular shape elongated in the left-right direction when viewed from the front surface side, and is provided with an internal space for storing waste toner. The storage-side protruding portions 41 described above protrude from lower end portions of the side surfaces of the waste toner container 40 in the left-right direction.

A back surface of the waste toner container 40 is provided with a toner receiving portion 42 facing the interior of the housing 30. The toner receiving portion 42 is a portion to be connected to a toner supply portion 32 (refer to FIG. 7 described below) of the housing 30. Toner is introduced into the waste toner container 40 via the toner supply portion 32 and the toner receiving portion 42. In the present embodiment, the toner supply portion 32 and the toner receiving portion 42 are provided at four locations spaced apart from each other in the left-right direction, respectively corresponding to the four image stations described above.

Claw portions 43 configured to lock with the lock lever 50 are provided on the side surfaces of the upper portion of the waste toner container 40 in the left-right direction. The claw portions 43 each extend in the backward direction B. A distal end of each claw portion includes a projection protruding outward in the left-right direction. More specifically, at the claw portion 43 provided on the side surface in the leftward direction L (claw portion 43 on the right side in FIG. 6), the projection at the distal end protrudes in the leftward direction L toward the corresponding lock lever 50. Further, at the claw portion 43 provided on the side surface in the rightward direction R (claw portion 43 on the left side in FIG. 6), the projection at the distal end protrudes in the rightward direction R toward the corresponding lock lever 50.

Figure 7:
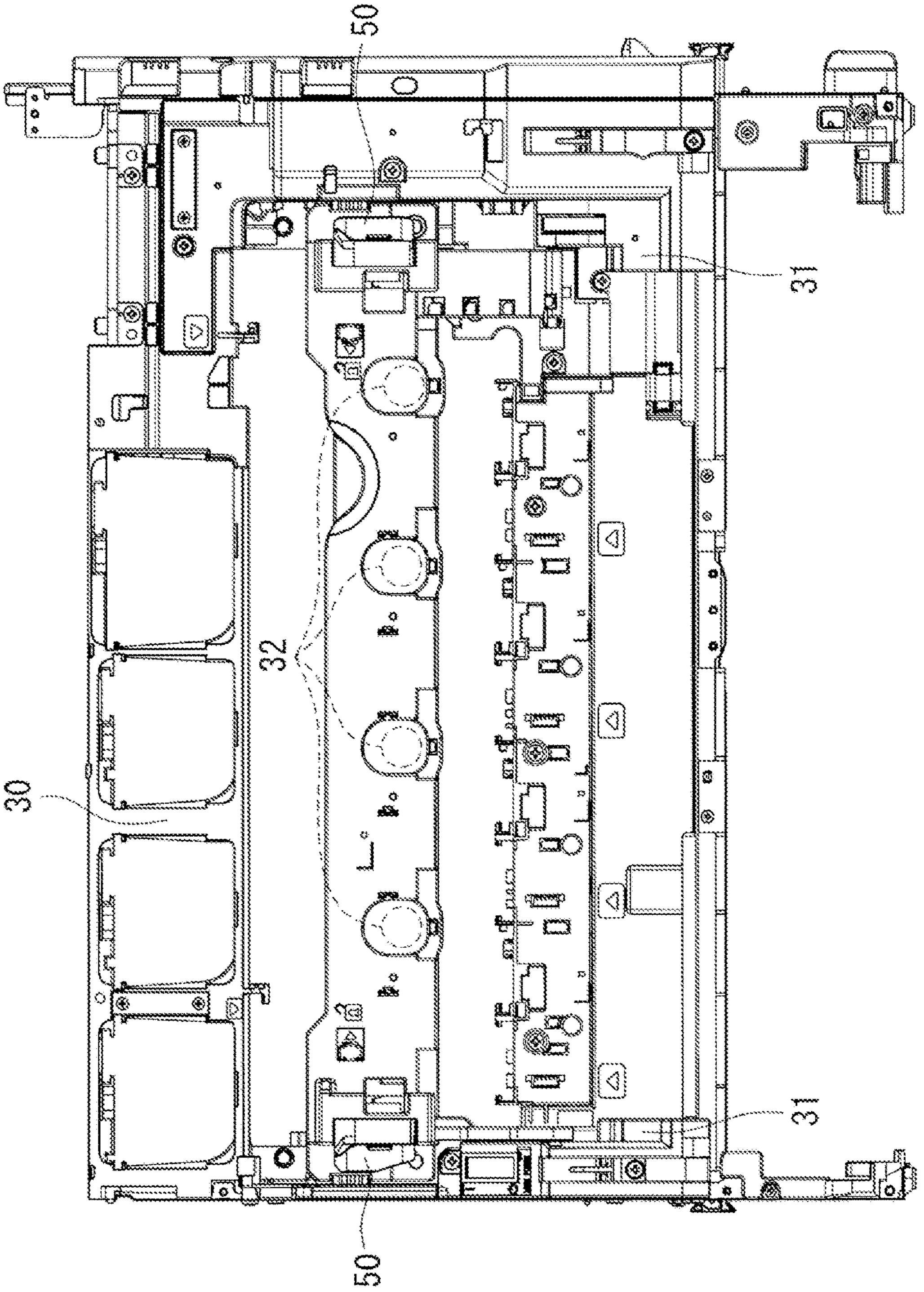
FIG. 7 is a schematic side view illustrating a portion of the housing.

FIG. 7 is a schematic side view illustrating a portion of the housing.

FIG. 7 illustrates a portion of the housing 30 provided on the front surface side of the image forming device 100, and corresponds to a state in which the waste toner container 40 is removed from the image forming device 100 illustrated in FIG. 4.

As described above, the housing 30 is provided with the toner supply portion 32 at a position corresponding to the toner receiving portion 42 in a state in which the waste toner container 40 is attached. The toner supply portion 32 is provided with a shutter biased by a spring, for example. The shutter is closed by the biasing force of the spring when the toner receiving portion 42 is not connected. When connecting the toner receiving portion 42 to the toner supply portion 32, the shutter is opened by a force that pushes the waste toner container 40 inward, thereby introducing waste toner discharged from the toner supply portion 32 into the waste toner container 40 via the toner receiving portion 42. That is, the spring provided in the toner supply portion 32 acts to push back the waste toner container 40 when the toner receiving portion 42 comes into contact with the spring.

Figure 8:
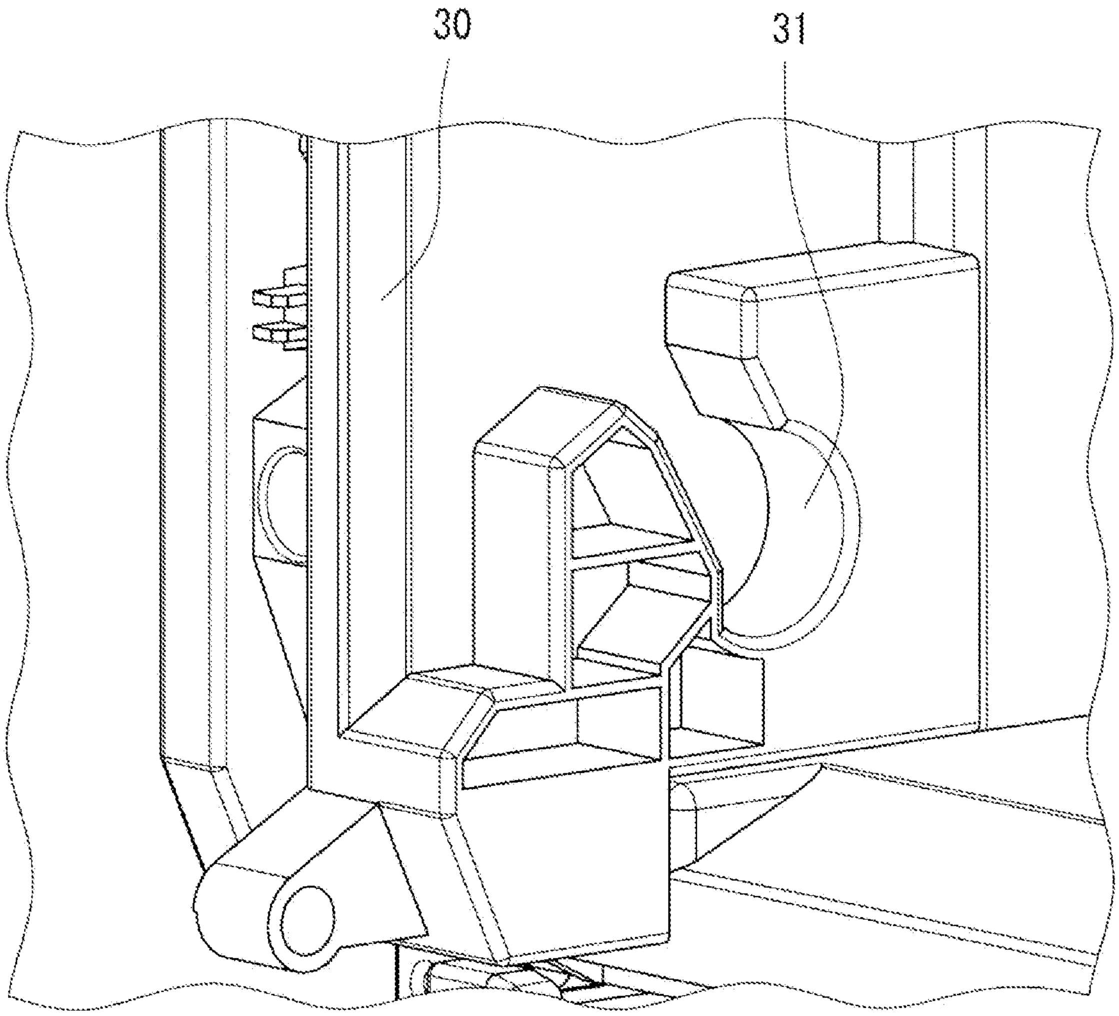
FIG. 8 is an enlarged perspective view illustrating a housing-side recessed portion and the vicinity thereof.

FIG. 8 is an enlarged perspective view illustrating a housing-side recessed portion and the vicinity thereof.

FIG. 8 illustrates, of the two housing-side recessed portions 31, one provided at an end portion of the housing 30 in the leftward direction L. Note that the other housing-side recessed portion 31 has substantially the same structure as that of the housing-side recessed portion 31 illustrated in FIG. 8, and thus illustration and description thereof will be omitted.

The housing-side recessed portion 31 is a wall portion provided by forming a gap having a shape corresponding to the storage-side protruding portion 41, and is provided with a groove extending upward from the gap surrounded by the wall portion. When the waste toner container 40 is attached to the housing 30, the storage-side protruding portion 41 inserted through the groove is fitted into the housing-side recessed portion 31. By fitting the storage-side protruding portion 41 into the housing-side recessed portion 31, the lower end portion of the waste toner container 40 is pivotally supported by the housing 30. When mounted, the waste toner container 40 pivots with the lower end portion serving as a fulcrum, and the upper end portion of the waste toner container 40 is pressed against the housing 30.

Figure 9:
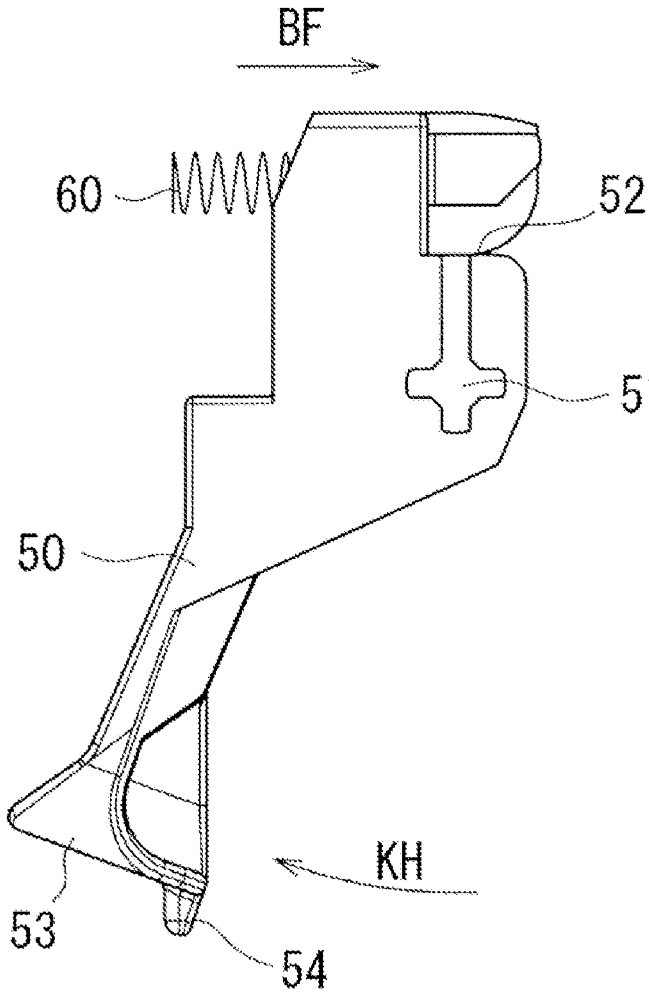
FIG. 9 is a top view illustrating a lock lever.
Figure 10:
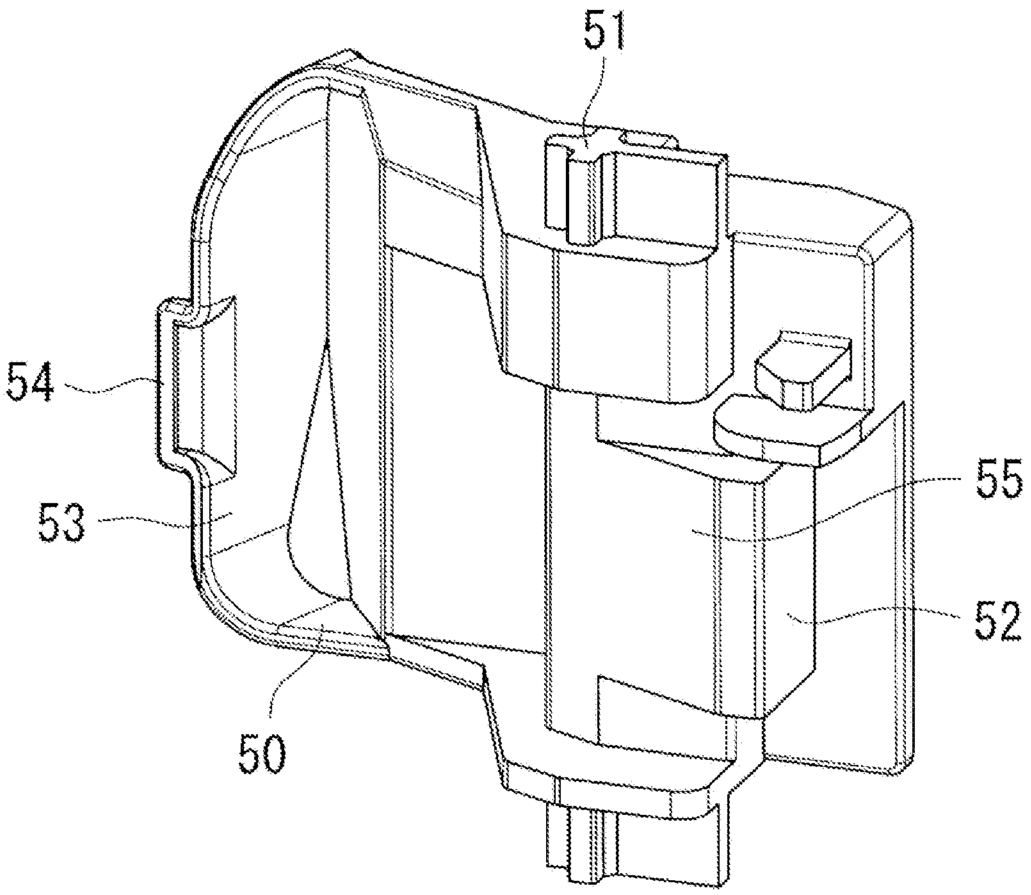
FIG. 10 is a perspective view illustrating the lock lever.

FIG. 9 is a top view illustrating the lock lever, and FIG. 10 is a perspective view illustrating the lock lever.

FIG. 9 and FIG. 10 each illustrate, of the two lock levers 50, one lock lever 50 provided in the vicinity of an end portion (left end portion in FIG. 4) of the housing 30 in the leftward direction L. The other lock lever 50 has substantially the same structure except that the left and right are reversed, and thus illustration and description thereof will be omitted.

The lock lever 50 has a structure in which a lever fulcrum 51 provided slightly rearward (upward in FIG. 9) of the center of the lock lever 50 in a front-back direction (frontward direction F and backward direction B) is supported by the housing 30, and the lock lever 50 pivots with the lever fulcrum 51 serving as a fulcrum. Further, the lock lever 50 includes a pressed portion 55 extending in the backward direction B from the vicinity of the lever fulcrum 51, and a locking portion 52 provided on a back side of the pressed portion 55. The pressed portion 55 and the locking portion 52 are portions of a projection that protrudes further than surrounding portions in the rightward direction R, that is, in a direction toward the waste toner container 40 while the waste toner container 40 is attached to the housing 30. More specifically, the pressed portion 55 is an inclined surface facing the waste toner container 40 (particularly, the claw portion 43), and the locking portion 52 is a wall surface extending in a direction intersecting the pressed portion 55.

An opposing portion 53 is provided at a distal end of a portion of the lock lever 50 extending frontward of the lever fulcrum 51 (downward in FIG. 9). An opposing projection 54 protruding in a direction outward of the housing 30, that is, toward the frontward direction F side, is provided at an end portion of the opposing portion 53 on the rightward direction R side.

A biasing member 60 such as a spring is attached to the lock lever 50. The biasing member 60 applies a biasing force BF that biases, in the rightward direction R, a side of the lock lever 50 rearward of the lever fulcrum 51. Due to the biasing force from the biasing member 60, the lock lever 50 rotates with the lever fulcrum 51 serving as a fulcrum. As a result, the opposing portion 53 side moves in the leftward direction L. That is, when not pressed by the waste toner container 40 (particularly, the claw portion 43), the lock lever 50 rotates in a direction (a rotation direction KH illustrated in FIG. 9) in which the locking portion 52 side moves toward an attachment position of the waste toner container 40 and the opposing portion 53 side moves away from the attachment position of the waste toner container 40.

As described above, the lock lever 50 is configured to pivot about the lever fulcrum 51 supported by the housing 30. Thus, a simple structure that swingably supports the lock lever can be achieved.

Next, movement of the lock lever 50 when the waste toner container 40 is attached to the housing 30, and the positional relationship between the lock lever 50 and the protruding portion 141 of the access cover 140, will be described with reference to FIG. 11 to FIG. 13. Note that FIG. 11 to FIG. 13 each schematically illustrate a cross section of main parts of the lock lever 50, the waste toner container 40, and the access cover 140 for ease of illustration.

Figure 11:
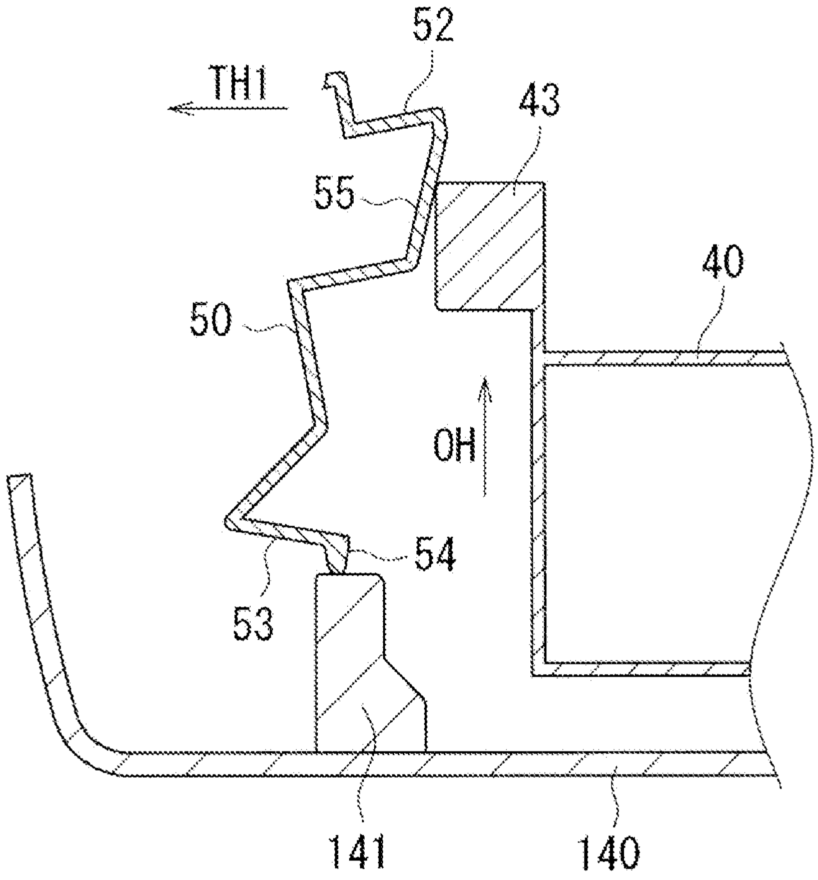
FIG. 11 is a schematic cross-sectional view illustrating the lock lever, the waste toner container, and the access cover in a pressed state (1).

FIG. 11 is a schematic cross-sectional view illustrating the lock lever, the waste toner container, and the access cover in a pressed state (1).

FIG. 11 illustrates a cross section of the lock lever 50 provided on the left side of the housing 30 and the vicinity thereof, as viewed from above. When the waste toner container 40 is attached to the housing 30, the waste toner container 40 is pushed in a push-in direction OH (backward direction B) toward the interior of the housing 30. The pressed portion 55 of the lock lever 50 is located at a position on a trajectory followed by the corresponding claw portion 43 when the waste toner container 40 is attached to the housing 30, and is pressed by the claw portion 43 in contact with the pressed portion 55. Then, when the pressed portion 55 is pressed by the claw portion 43 so as to retract, the lock lever 50 rotates in a direction in which the locking portion 52 side moves away from the claw portion 43 (in the direction of an arrow TH1). Preferably, the pressed portion 55 is a flat surface inclined with respect to the push-in direction OH so that the claw portion 43 is not caught on the pressed portion 55 at this time.

As illustrated in FIG. 11, the pressed state in which the lock lever 50 (particularly, the pressed portion 55) is pressed by the waste toner container 40 (particularly, the claw portion 43) is a state in which the waste toner container 40 is not completely attached to the housing 30. In this state, there is space to move the waste toner container 40 in the push-in direction OH and a gap exists between the waste toner container 40 and the housing 30. Thus, positioning of the waste toner container 40 is not completed, and the toner supply portion 32 and the toner receiving portion 42 are not connected to each other.

In the pressed state, the opposing portion 53 is positioned at a preventing position at which the access cover 140 is prevented from closing. Specifically, when the access cover 140 is closed, the opposing portion 53 is disposed at a position on (blocking) the trajectory followed by the corresponding protruding portion 141. That is, the opposing portion 53 and the protruding portion 141 overlap in the left-right direction. The access cover 140 cannot be closed because the protruding portion 141 abuts against the opposing portion 53.

When the detection unit detects that the access cover 140 is open, the notification unit may issue a warning. The method of notification may be selected as appropriate. For example, a speaker that emits sound or the like may be provided, or a screen indicating a warning may be displayed on the operation panel 130 described above. Since a warning is issued when the detection unit detects the opening and closing of the access cover 140, image formation in a state in which the waste toner container 40 is not completely attached can be prevented.

Figure 12:
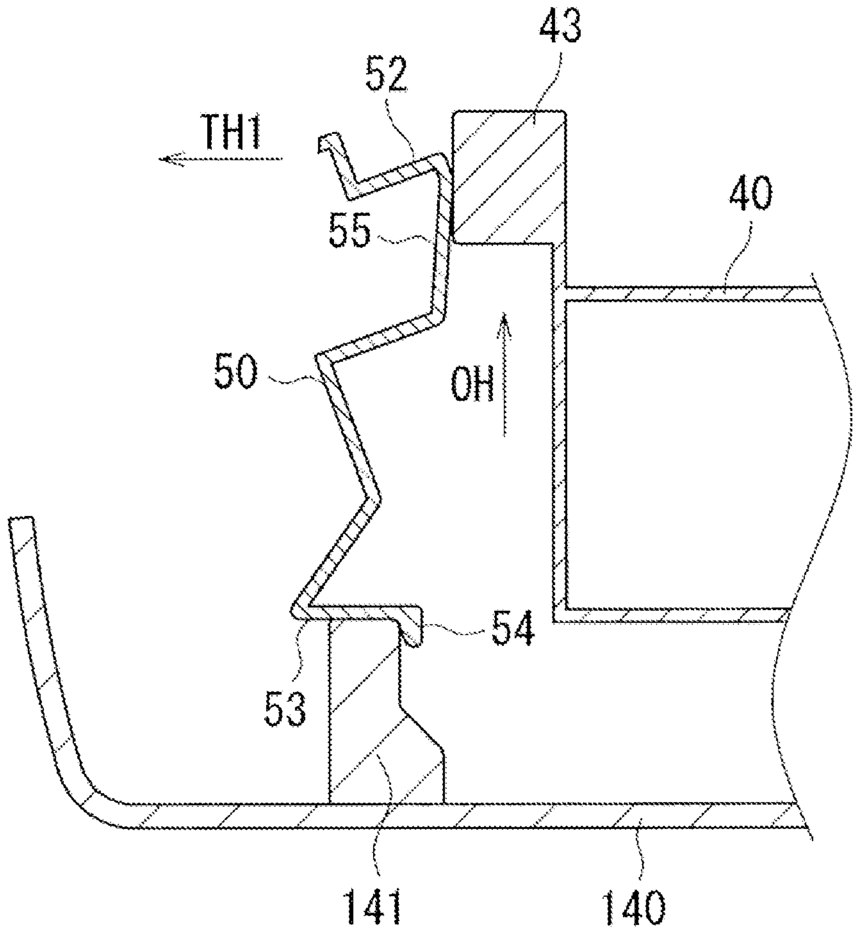
FIG. 12 is a schematic cross-sectional view illustrating the lock lever, the waste toner container, and the access cover in the pressed state (2).

FIG. 12 is a schematic cross-sectional view illustrating the lock lever, the waste toner container, and the access cover in the pressed state (2).

FIG. 12 illustrates a state in which the waste toner container 40 is moved in the push-in direction OH from the state illustrated in FIG. 11. The claw portion 43 is in contact with the lock lever 50 near a boundary between the pressed portion 55 and the locking portion 52, and presses the pressed portion 55. Since the pressed portion 55 is pressed by the claw portion 43, the locking portion 52 side of the lock lever 50 is further moved in the direction of the arrow TH1.

Even in the pressed state illustrated in FIG. 12, the opposing portion 53 is located at the preventing position and blocks the protruding portion 141. In the state illustrated in FIG. 12, a distal end of the protruding portion 141 is in contact with the opposing portion 53, and a right side surface of the protruding portion 141 is in contact with the opposing projection 54, and as a result, the opposing projection 54 is locked by the protruding portion 141.

When the lock lever 50 is pressed by the access cover 140, a force received from the access cover 140 may act in a direction that causes the lock lever 50 to rotate, depending on the orientation in which the opposing portion 53 and the protruding portion 141 come into contact with each other. At this time, the rotation of the lock lever 50 can be restricted by the opposing projection 54 being locked by the protruding portion 141. That is, when the lock lever 50 blocks the protruding portion 141, the opposing projection 54 is locked by the protruding portion 141, and movement of the lock lever 50 in a direction from the preventing position toward a retracted position described below is restricted. The opposing projection 54 provided described above can restrict movement of the lock lever 50 caused by the lock lever 50 being pressed by the access cover 140.

Figure 13:
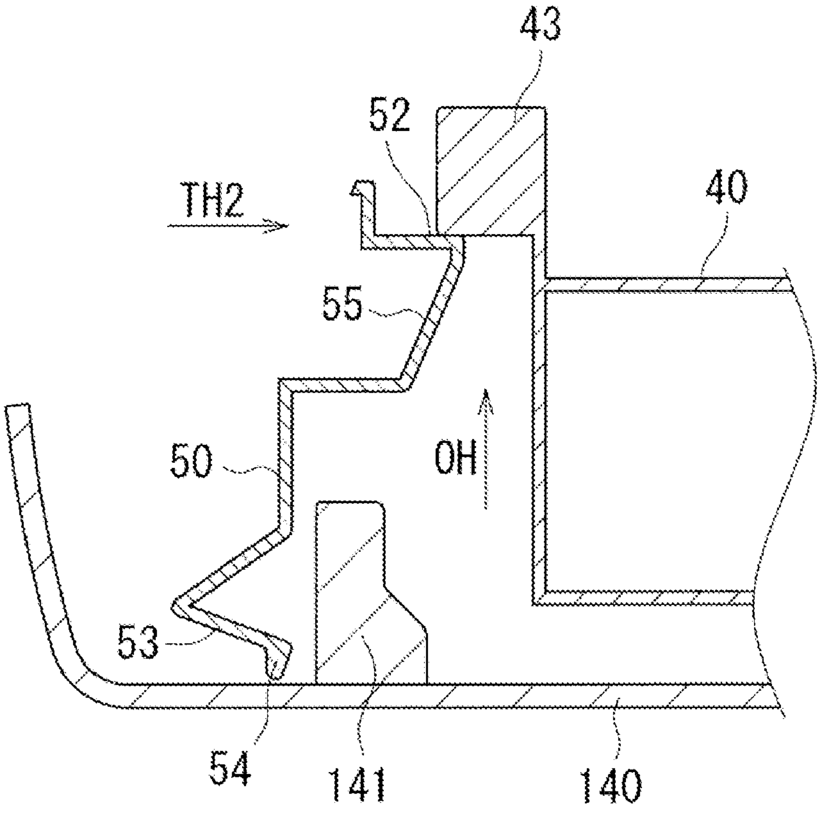
FIG. 13 is a schematic cross-sectional view illustrating the lock lever, the waste toner container, and the access cover in a locked state.

FIG. 13 is a schematic cross-sectional view illustrating the lock lever, the waste toner container, and the access cover in a locked state.

FIG. 13 illustrates a state in which the waste toner container 40 is further moved in the push-in direction OH from the state illustrated in FIG. 12. Due to this movement, the claw portion 43 moves beyond the pressed portion 55 and is positioned inward of the locking portion 52. Since the pressed portion 55 is not pressed by the claw portion 43, the lock lever 50 is biased by the biasing member 60 and rotates in a direction in which the locking portion 52 side moves toward the claw portion 43 (direction of the arrow TH2). When the lock lever 50 rotates, the locking portion 52 moves to a position overlapping a portion of a side surface of the claw portion 43 on the frontward direction F side. As a result, the claw portion 43 is locked by the locking portion 52, and the movement of the waste toner container 40 in the frontward direction F is restricted. In the locked state in which the waste toner container 40 is locked and positioned by the lock lever 50, the waste toner container 40 is sufficiently close to the housing 30, and the toner supply portion 32 and the toner receiving portion 42 are connected to each other.

In the locked state, the opposing portion 53 is positioned in the retracted position at which the opposing portion 53 does not block the protruding portion 141 of the access cover 140. Specifically, when the access cover 140 is closed, the opposing portion 53 is disposed at a position not overlapping (not blocking) the trajectory followed by the corresponding protruding portion 141. That is, the positions of the opposing portion 53 and the protruding portion 141 are misaligned in the left-right direction. In this state, the access cover 140 can be closed because the protruding portion 141 does not abut against the opposing portion 53.

As described above, the lock lever 50 that locks the waste toner container 40 blocks the access cover 140, making it possible to prompt a user to check whether the waste toner container 40 is completely attached, without the need for a new member or a sensor.

Further, since the lock lever 50 is biased by the biasing member 60, it is possible to reliably transition to the locked state in which the waste toner container 40 is locked.

The lock lever 50 is provided with a portion (locking portion 52) for locking the waste toner container 40 and a portion (opposing portion 53) for blocking the access cover 140, and this can prevent the access cover 140 from closing when the waste toner container 40 is being positioned and mounting is incomplete.

As described above, when mounted onto the housing 30, the waste toner container 40 is subject to a force from a spring or the like provided in the toner supply portion 32 and is thus pressed back. This causes a sufficient counterforce to act on the left end portion and right end portion of the waste toner container 40, thus locking the waste toner container 40 with the lock lever 50. If a force is applied to only one end portion, the waste toner container 40 may be insufficiently locked with the lock lever 50 at the other end portion despite being locked with the lock lever 50 at the one end portion. If the waste toner container 40 is insufficiently locked with the lock lever 50, the toner supply portion 32 and the toner receiving portion 42 may not be connected to each other.

To deal with this, in the present embodiment, the lock levers 50 are provided at positions respectively facing opposing side surfaces (left side surface and right side surface in FIG. 4) of the waste toner container 40, as illustrated in FIG. 4. Thus, since the pair of lock levers 50 respectively lock the opposing side surfaces of the waste toner container 40, the entire waste toner container 40 can be reliably positioned with respect to the housing 30.

Second Embodiment

Next, an image forming device according to a second embodiment of the disclosure will be described with reference to the accompanying drawings. Note that the structure of the image forming device according to the second embodiment is substantially the same as that of the first embodiment illustrated in FIG. 1 to FIG. 13, and thus the same reference signs will be used and descriptions and drawings will be omitted.

Figure 14:
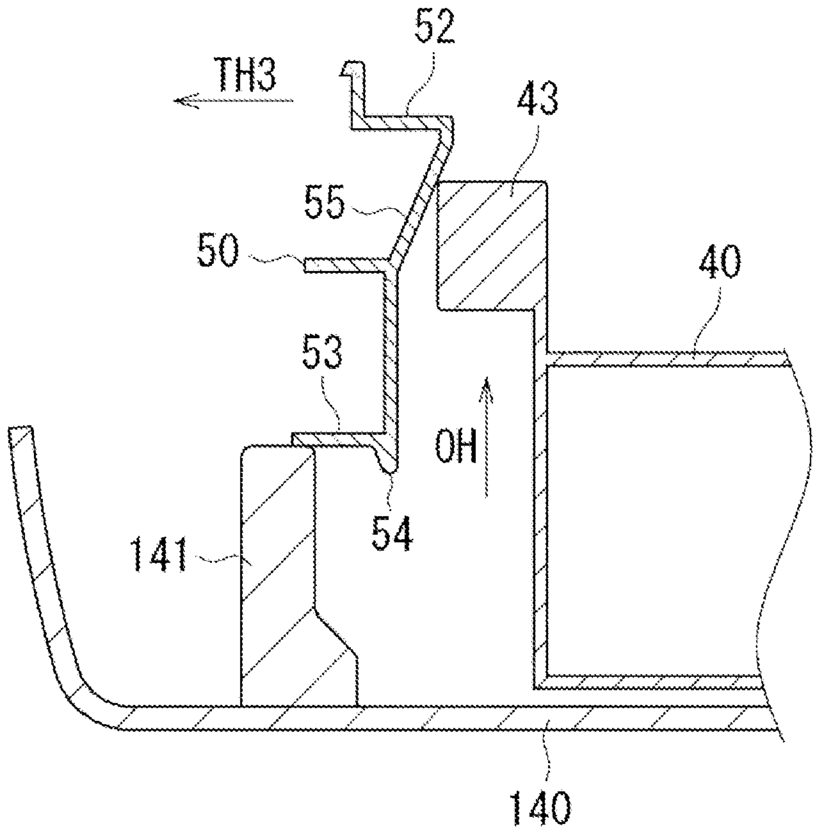
FIG. 14 is a schematic cross-sectional view illustrating an image forming device according to a second embodiment of the disclosure with the lock lever, the waste toner container, and the access cover in the pressed state.

FIG. 14 is a schematic cross-sectional view illustrating the image forming device according to the second embodiment of the disclosure with the lock lever, the waste toner container, and the access cover in the pressed state.

In the first embodiment, a structure is adopted in which the housing 30 supports the lever fulcrum 51 of the lock lever 50 and the lock lever 50 rotates. In the second embodiment, a structure is adopted in which the lock lever 50 slides in a direction (left-right direction) approaching the waste toner container 40 and a direction separating from the waste toner container 40. In this case, for example, a structure may be adopted in which a protruding portion provided on the lock lever 50 is supported by the housing 30 at a long hole formed therein. In this case, the lock lever 50 need only be slid while guided by the long hole. Thus, a structure in which the lock lever 50 is slidably supported by a simple configuration can be adopted.

In the present embodiment, similarly to the first embodiment, the pressed portion 55 of the lock lever 50 is provided at a position on the trajectory followed by the corresponding claw portion 43 when the waste toner container 40 is attached to the housing 30, and the pressed portion 55 is pressed by the claw portion 43 in contact with the pressed portion 55. Then, when the pressed portion 55 is pressed by the claw portion 43 and made to retract, the lock lever 50 slides in a direction in which the entire lock lever 50 moves away from the claw portion 43 (direction of the arrow TH3).

In the pressed state, the opposing portion 53 is located at a preventing position at which the access cover 140 is prevented from closing. When the access cover 140 is closed, the opposing portion 53 is located at a position on (blocking) the trajectory followed by the corresponding protruding portion 141. That is, the opposing portion 53 and the protruding portion 141 overlap in the left-right direction. The access cover 140 cannot be closed because the protruding portion 141 abuts against the opposing portion 53.

Figure 15:
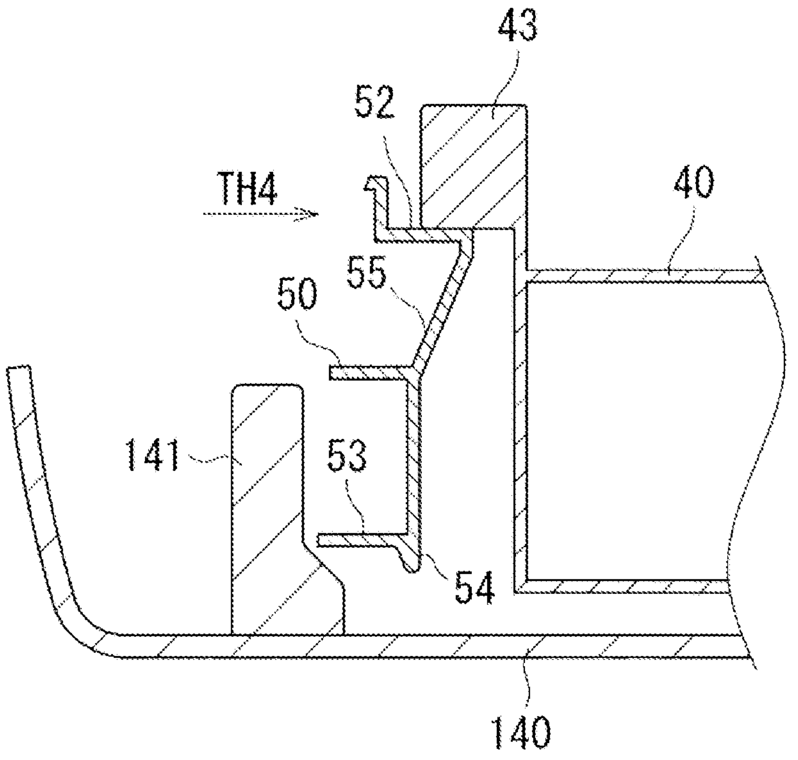
FIG. 15 is a schematic cross-sectional view illustrating the image forming device according to the second embodiment of the disclosure with the lock lever, the waste toner container, and the access cover in the locked state.

FIG. 15 is a schematic cross-sectional view illustrating the image forming device according to the second embodiment of the disclosure with the lock lever, the waste toner container, and the access cover in the locked state.

FIG. 15 illustrates a state in which the waste toner container 40 is further moved in the push-in direction OH from the state illustrated in FIG. 14. Due to this movement, the claw portion 43 moves beyond the pressed portion 55 and is positioned inward of the locking portion 52. In the present embodiment, the entire lock lever 50 is biased by the biasing member in a direction toward the claw portion 43 (direction of the arrow TH4). Therefore, in a state in which the pressed portion 55 is not pressed by the claw portion 43, the entire lock lever 50 slides in the direction of the arrow TH4, and the locking portion 52 moves to a position overlapping a portion of the side surface of the claw portion 43 on the frontward direction F side. As a result, the claw portion 43 is locked by the locking portion 52, and the movement of the waste toner container 40 in the frontward direction F is restricted. In the locked state in which the waste toner container 40 is locked and positioned by the lock levers 50, the waste toner container 40 is sufficiently close to the housing 30, and the toner supply portion 32 and the toner receiving portion 42 are connected to each other.

In the locked state, the opposing portion 53 is located at the retracted position at which the opposing portion 53 does not block the protruding portion 141 of the access cover 140. When the access cover 140 is closed, the opposing portion 53 is located at a position not overlapping (not blocking) the trajectory followed by the corresponding protruding portion 141. That is, the opposing portion 53 and the protruding portion 141 are misaligned in the left-right direction. In this state, the access cover 140 can be closed because the protruding portion 141 does not abut against the opposing portion 53.

In the first embodiment and the second embodiment described above, a configuration in which the claw portions 43 are provided on the left and right side surfaces of the waste toner container 40 is described, but the disclosure is not limited thereto. A configuration in which the claw portions 43 are provided on upper and lower side surfaces of the waste toner container 40 may be adopted, and the arrangement of the lock lever 50 may be changed accordingly. Even with this configuration, the lock lever 50 need only be disposed opposing the corresponding claw portion 43, and the pressed portion 55 and the locking portion 52 serve as portions of a projection protruding in a direction toward the claw portion 43 (up-down direction).

Note that the embodiments disclosed herein are illustrative in all respects and are not the basis for a limited interpretation. Thus, the technical scope of the disclosure is not to be construed by the foregoing embodiments only, and is defined based on the description of the claims. In addition, the meanings equivalent to the range of the claims and all changes made within the range are included.

REFERENCE SIGNS LIST

30 Housing
40 Waste toner container
43 Claw portion
50 Lock lever
51 Lever fulcrum
52 Locking portion
53 Opposing portion
54 Opposing projection
55 Pressed portion
60 Biasing member
100 Image forming device
140 Access cover
141 Protruding portion

The invention claimed is:

1. An image forming device comprising:

a housing;

an access cover attached in an openable/closable manner to a side surface of the housing;

a waste toner container attachable to the housing with the access cover open; and a lock lever that is attached to the housing and locks the waste toner container and the housing, wherein the access cover includes a protruding portion protruding toward an interior of the housing, and the lock lever transitions between a locked state of locking the waste toner container and a pressed state of being pressed by the waste toner container, and, when in the pressed state, moves to a preventing position at which the lock lever blocks the protruding portion and prevents the access cover from closing, and, when in the locked state, moves to a retracted position at which the lock lever does not block the protruding portion.

2. The image forming device according to claim 1, further comprising a biasing member biasing the lock lever in a direction from the preventing position toward the retracted position.

3. The image forming device according to claim 1, wherein the lock lever pivots about a fulcrum supported by the housing.

4. The image forming device according to claim 1, wherein the lock lever slides in a direction approaching the waste toner container and a direction separating from the waste toner container.

5. The image forming device according to claim 1, wherein the waste toner container includes a claw portion to be locked with the lock lever, the lock lever includes a locking portion that locks the claw portion, a pressed portion that is pressed by the claw portion, and an opposing portion provided facing the access cover in a closed state, and in the locked state, the locking portion locks the claw portion, and, in the pressed state, the pressed portion is pressed by the claw portion and the opposing portion blocks the protruding portion.

6. The image forming device according to claim 5, wherein the opposing portion includes an opposing projection protruding in a direction toward outside of the housing, and when the lock lever blocks the protruding portion, the opposing projection is locked by the protruding portion, and movement of the lock lever in a direction from the preventing position toward the retracted position is restricted.

7. The image forming device according to claim 1, wherein the lock lever is provided at positions respectively facing opposing side surfaces of the waste toner container.

8. The image forming device according to claim 1, further comprising a detection unit that detects opening and closing of the access cover; and a notification unit that issues a warning when the detection unit detects that the access cover is open.

* * * * *